(12) United States Patent
Walba

(10) Patent No.: US 7,682,521 B2
(45) Date of Patent: Mar. 23, 2010

(54) ALIGNED LIQUID CRYSTAL THIN FILMS AND GLASSES

(75) Inventor: David M. Walba, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 233 days.

(21) Appl. No.: 10/569,106

(22) PCT Filed: Aug. 23, 2004

(86) PCT No.: PCT/US2004/027262

§ 371 (c)(1),
(2), (4) Date: Nov. 17, 2006

(87) PCT Pub. No.: WO2005/019911

PCT Pub. Date: Mar. 3, 2005

(65) Prior Publication Data

US 2007/0080322 A1     Apr. 12, 2007

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 430/20; 428/1.1; 349/167; 349/168; 349/169

(58) Field of Classification Search ............ 252/299.01, 252/299.6; 430/20; 428/1.1; 349/167–169
See application file for complete search history.

(56) References Cited

U.S. PATENT DOCUMENTS 5,039,208 A      8/1991   Ohnishi et al.
5,620,756 A *    4/1997   Bach et al. ................... 428/1.1

OTHER PUBLICATIONS

International Search Report and Written Opinion of the International Searching Authority dated Feb. 22, 2006.
International Preliminary Report on Patentability of the International Bureau dated Mar. 23, 2006.

* cited by examiner

*Primary Examiner*—Geraldina Visconti
(74) *Attorney, Agent, or Firm*—Merchant and Gould

(57) ABSTRACT

The present disclosure includes a method that allows one to obtain high quality alignment of nematic or smectic liquid crystal (LC) polymer glasses in thin films. The present disclosure also includes thin films of aligned smectic or nematic LC main-chain polymer glasses, including aligned chiral smectic C* ferroelectric LC main-chain polymer glasses. The disclosure also includes electro-optical devices, including electro-optical devices comprising aligned chiral smectic C* ferroelectric LC main-chain polymer glasses.

16 Claims, 6 Drawing Sheets

ALIGNED LIQUID CRYSTAL THIN FILMS AND GLASSES

FIELD OF THE INVENTION

This invention relates to the field of liquid crystals (LCs), specifically to the field of LC main-chain polymers and to the field of aligned LC main-chain polymer glasses.

BACKGROUND OF THE INVENTION

Liquid crystals (LCs) exhibit signature structural features over a large hierarchy of length scales ranging from molecular to macroscopic. The covalent chemical structure of the LC molecules (mesogens, ~10-100 Å)) provides the anisotropic fluid self-assembly termed a liquid crystal (~1000 Å-1 μm). However, at macroscopic length scales (~100s of μm-100 inches) an LC sample will typically possess a great many defects, and the LC will exist as a polydomain.

In order to be useful in applications, typically the LC structure must be controlled over macroscopic length scales in at least one dimension, by a process generally termed alignment. In many LC devices, such as lap top computer displays, high quality alignment (that is alignment without defects perceivable when viewing the display) must be achieved in samples on the order of 5 μm in thickness and ~100 square inches in area.

Alignment is typically obtained by contacting the LC with a pair of solid substrates, at least one of which has been treated to cause a uniform LC structure over large length scales, forming an LC cell. Often such aligning substrates are comprised of solid glass plates, which my also possess other functionality, such as color filter arrays, thin film transistor arrays or other electrodes, with means of applying electric fields to the LC for electro-optic switching. The glass plates are coated with a polymer thin film, this film having been rendered anisotropic by mechanical rubbing. Such a rubbed polymer film alignment layer then provides the desired uniform alignment of the LC.

The LC mesogens are typically organic molecules possessing a rigid core and one or two flexible tails (FIG. 1A). The mesogens have a large aspect ratio (i.e. they are long and thin); the average long axis of the mesogens being termed the molecular The LC mesogens are typically organic molecules possessing a rigid core and one or two flexible tails (FIG. 1A). The mesogens have a large aspect ratio (i.e. they are long and thin); the average long axis of the mesogens being termed the molecular director. In the LC phase, the molecular directors are oriented along an axis at the length scale of the LC self-assembly, also termed the director. It is the goal of alignment to orient the LC director macroscopically.

Smectic LCs exhibit at least one phase in which the mesogenic molecules self-assemble into a layered structure with quasi long-range positional order in one dimension; along the layer normal. High quality alignment of smectic LCs requires, in addition to uniform macroscopic orientation of the LC director, also obtaining a macroscopic structure wherein the layers are uniform (e.g. flat and parallel) over the entire sample.

LC main-chain polymers comprise mesogenic monomer units linked covalently along the molecular director to form a polymer possessing two or more mesogenic units (FIG. 1B). In such polymers it is possible to heat the sample into an isotropic fluid phase, and on cooling progress through LC phases, at least one of which is a nematic or smectic phase, and finally freeze into an organic glass possessing the structure of the nematic or smectic LC phase from which the freezing occurs. Smectic LC glasses in particular are useful for various photonic applications, such as second order non-linear optics applications, especially when the glass freezes from a chiral smectic C* (SmC*) ferroelectric LC (FLC) phase, or from a polar smectic C (SmCP) banana phase, or other polar phases whose structures are well known to those familiar with the smectic LC art; however, in most photonic applications these glasses are only useful if alignment of the smectic layers can be achieved. Furthermore, in many such applications, the LC glass should preferably be a thin film oriented between solid substrates, forming an LC cell as described above.

SUMMARY OF THE INVENTION

The present disclosure includes a method that allows one to obtain high quality alignment of nematic or smectic LC glasses in thin films. The method comprises the steps of:
 (a) heating a glassy liquid crystal (LC) main-chain polymer fiber into the nematic or smectic LC phase;
 (b) compressing said main-chain polymer fiber in the nematic or smectic phase between opposed substrates wherein an aligned thin film of nematic or smectic LC main-chain polymer is formed between said opposed substrates; and
 (c) cooling said thin film of nematic or smectic LC main-chain polymer into the glassy phase.

When the main-chain polymer is in the nematic phase, that phase is preferably selected from a chiral nematic N* phase and an achiral nematic phase. When the main-chain polymer fiber is in the smectic phase, that phase is preferably selected from the group consisting of a smectic C* phase, a smectic A* phase, a smectic C phase, a smectic A phase, or one of the ferroelectric SmCP phases. The smectic C* phase is preferably a ferroelectric smectic C* phase. The fiber may be produced, for example, by pulling or extrusion from an isotropic melt of the main-chain polymer.

One or both of the substrates is preferably comprised of glass or a semi-conductor. The substrates may be separated by spacers and the compressing force may be exerted by, for example, a weight or by the application of a piston on one or both of the substrates. The compressing force may be exerted either during or after the heating of the fiber.

The present disclosure also includes an apparatus comprising a thin film of aligned smectic or nematic liquid crystal (LC) main-chain polymer glass sandwiched between opposed substrates. When the main-chain polymer is in the nematic phase, that phase is preferably selected from a chiral nematic N* phase and an achiral nematic phase. When the main-chain polymer fiber is in the smectic phase, that phase is preferably selected from the group consisting of a smectic C* phase, a smectic A* phase, a smectic C phase, a smectic A phase, or one of the ferroelectric SmCP phases. Preferably the thin film is a thin film of aligned main-chain polymer in a smectic C* ferroelectric LC phase.

The disclosure also includes electro-optical devices, including electro-optical devices comprising thin films of aligned chiral smectic C* ferroelectric or aligned ferroelectric SmCP LC main-chain polymer glasses operably associated with one or more electrodes.

BRIEF DESCRIPTION OF THE DRAWINGS

FIG. 6 also illustrates that application of a positive (V=10V/μm) or negative field (V=−10V/μm) causes the optic axis of the sample to rotate.

DETAILED DESCRIPTION OF THE PREFERRED EMBODIMENTS

The present disclosure includes a method for obtaining high quality alignment of nematic or smectic LC glasses in thin films. In a preferred embodiment, a glassy main-chain polymer fiber possessing the frozen smectic or nematic LC structure is created by standard means, such as pulling or extruding a fiber from the isotropic melt of the polymer. A non-limiting example of a suitable polymer is provided in the examples. The diameter of the smectic or nematic LC glass fiber is not critical. Preferred diameters are in the range of about 1 μm to about 100 μm, but smaller or larger diameters may also be used.

Figure 2:
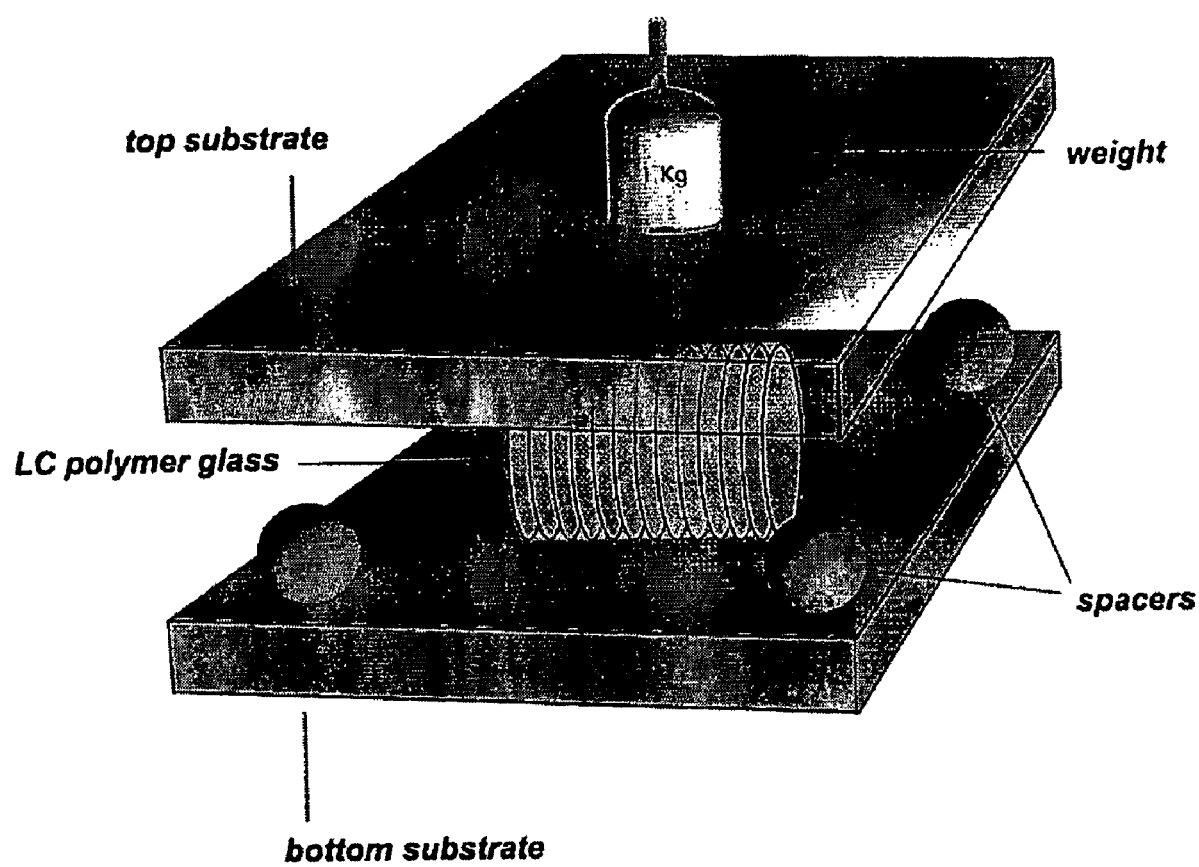
FIG. 2 depicts a glassy smectic LC fiber placed between opposed substrates separated with spacers having a diameter smaller than the diameter of the smectic LC fiber.

In one embodiment, the glassy LC fiber is placed between opposed substrates, preferably between substrates that are separated with spacers having a diameter smaller than the diameter of the smectic LC fiber, as indicated in FIG. 2. Preferably, the opposed substrates form a vertical "sandwich" with a top and a bottom substrate. Suitable substrates are comprised of materials that are suitable for LC cells and or other types of electro-optical cells, including but not limited to glass or semiconductors.

The assembly comprising the opposed substrates and the glassy LC fiber is then heated using any suitable heating system known in the art, including but not limited to ovens, hot plates, and Peltier elements. The assembly is heated to a temperature at which the glassy LC fiber transitions into the desired nematic or smectic LC phase, but not into a higher-temperature phase such as an isotropic phase.

Either simultaneously with the heating step, or after the heating step, a compressing force is then exerted on one or both of the opposed substrates in such a manner that the LC fiber may be compressed between the opposed substrates. By way of non-limiting example the compressing force may be exerted using a weight that is placed on the top substrate. See FIG. 2. In another embodiment, the compressing force is exerted by piston. The piston can be controlled by a controller in order to exert a predetermined compressing force on the opposed substrates. In other embodiments, the weight of the top substrate itself may be sufficient to compress the glassy LC fiber. This configuration is stable when the fiber is in the glassy state.

Figure 3:
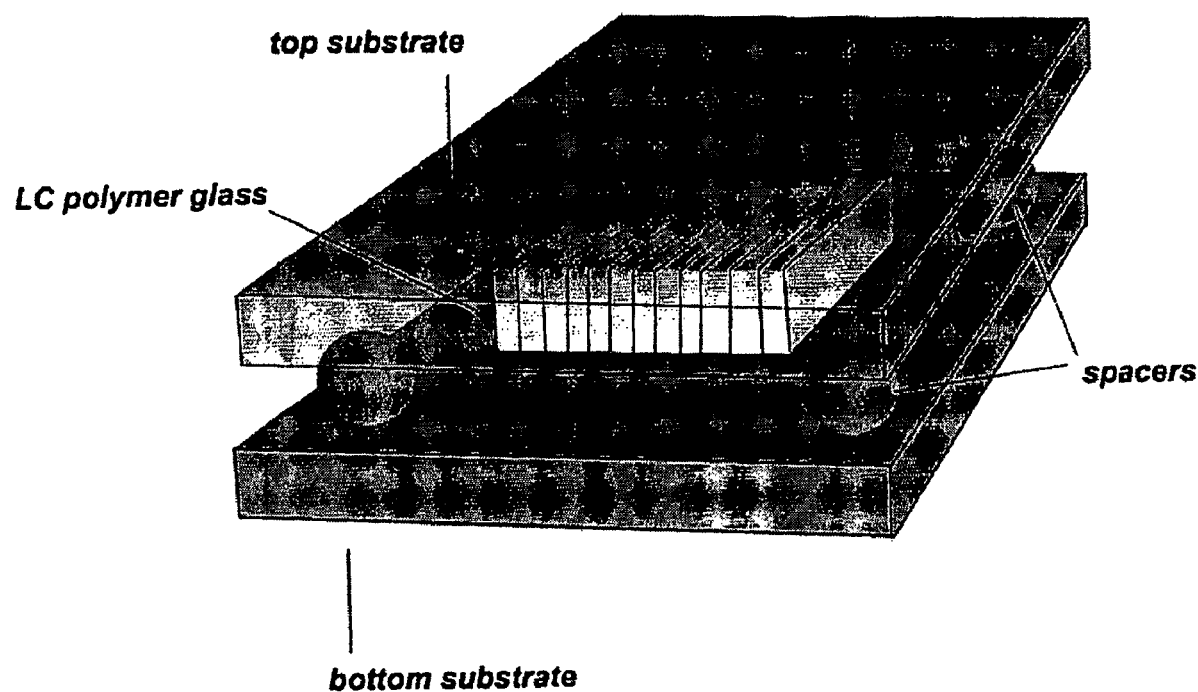
FIG. 3 depicts a thin film of aligned smectic LC with a uniform layer structure.

Since the LC phase is fluid, a compressing force exerted on fiber by the opposed substrates will "squish" the fiber thereby forming a thin film of LC. If the substrates are separated by spacers, then the "squishing" will continue until the substrates contact the spacers. See FIG. 3. The spacers are not essential, and in one embodiment the spacers are not used and the fiber is squished until a desired thickness is obtained. In this embodiment, once the desired thickness is obtained, the compressing force is removed.

The thickness of the film can be readily monitored in real time using any technique known in the art, including, but not limited to, interferometry in parts of the cell where the cell gap is filled with air. The length of the starting fiber determines the length of the film. The thickness of the film is determined by the final spacing between the opposed substrates, and the width of the film is determined by the geometry of the system (that is, the diameter of the starting fiber, given that the volume of the polymer sample preferably does not change appreciably during the process).

The thin film is then cooled into the glassy phase using any suitable cooling apparatus known in the art. For example, the thin film can be cooled using a refrigerator, or by using a Peltier element that is thermally associated with the opposed substrates; this same Peltier element may also be used to heat the glassy LC fiber.

Cooling into the glassy phase provides a thin film of the desired frozen aligned nematic or smectic LC. Depending upon the nature of the opposed substrates, various director structures can be obtained using this method, including for example a twisted structure or a uniform structure with the director parallel to the substrates. Many possible director structures are useful, as long as the layer structure is uniform.

The main-chain polymers useful in the disclosed methods include, but are not limited to, main-chain polymers having the following phase sequences:

Isotropic-nematic-Glass
Isotropic-smectic C-Glass
Isotropic-smectic A-Glass
Isotropic-smectic A-smectic C-Glass
Isotropic-nematic-smectic A-smectic C-Glass
Isotropic-nematic-smectic C-Glass
Isotropic-nematic-smectic A-Glass The nematic phase in any of these examples may be achiral or chiral (N*) nematic. Similarly, the smectic phase in these examples can be achiral (smectic A or smectic C) or chiral smectic (smectic A* or smectic C*). As used herein, "smectic A*" and "smectic C*" refer respectively to a smectic A or smectic C liquid crystal phase composed of enantiomerically enriched molecules. "N*" refers to a nematic liquid crystal phase composed of enantiomerically enriched molecules.

The methods, compositions, and apparatus disclosed herein are not limited to main-chain polymers having the above-mentioned phases. Other phases are well known to those skilled in the art. For example, in some embodiments the main-chain polymer has a banana phase, more preferably a polar smectic C (SmCP) banana phase, and more preferably a ferroelectric SmCP phase. The SmCP phases, also known as subphases of the B2 banana phase, can be composed of achiral, racemic, or enantiomerically enriched molecules.

Figure 1:
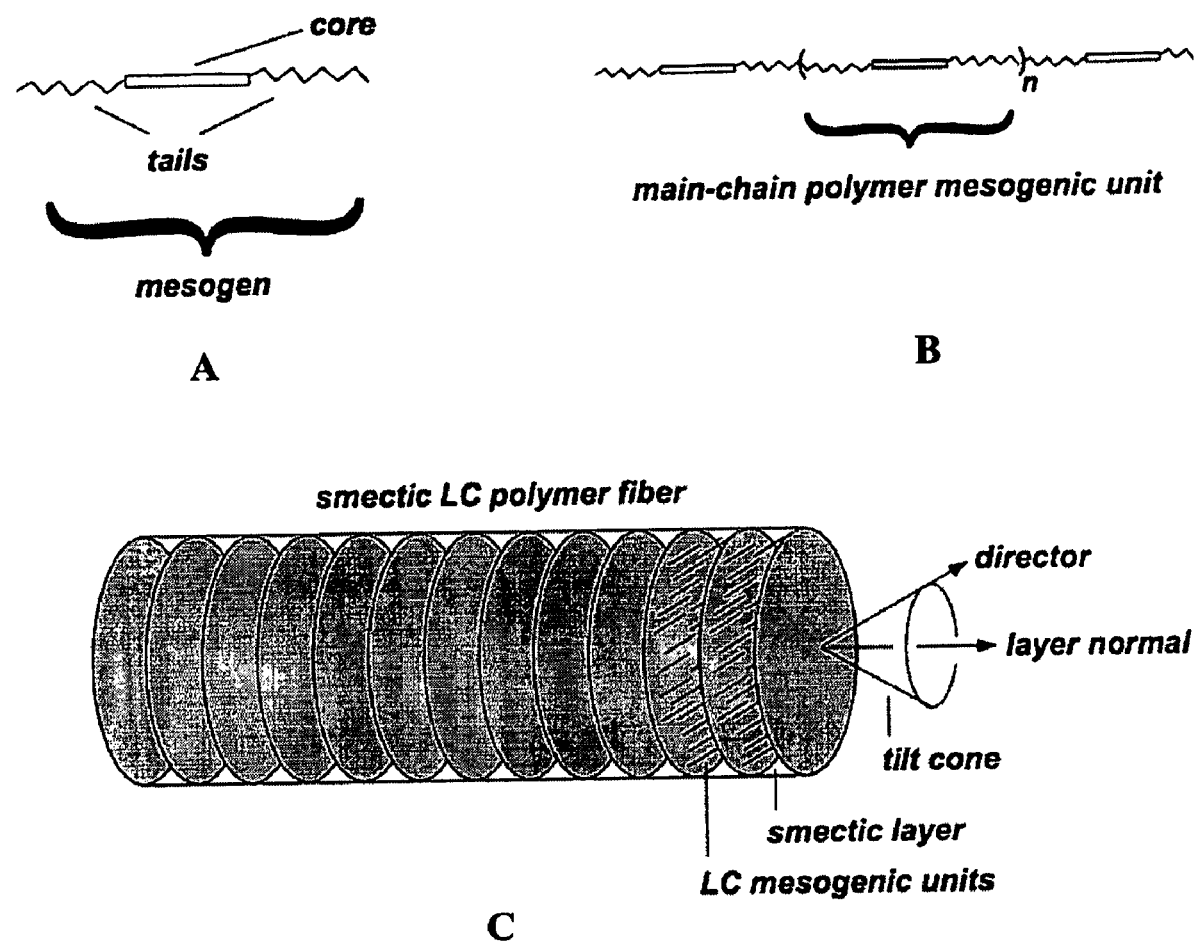
FIG. 1A depicts a mesogen schematically.
FIG. 1B depicts schematically a main-chain polymer comprising mesogenic units.
FIG. 1C depicts schematically a smectic LC polymer fiber having smectic layers and a tilted director.

In embodiments where the glassy fiber has the frozen smectic structure, the layers preferably have some degree of uniformity, and more preferably have a substantially uniform structure. The exact layer structure is not critical, and can include simple flat layers, for example where the layers are uniformly oriented perpendicular to the fiber axis. Such a layer structure is depicted in FIG. 1C. More complex layer structures are also contemplated, including, without limitation, conical layers with a chevron-like cross section.

In preferred embodiments, the smectic LC phase above the glass is a smectic A* (SmA*) or smectic C* (SmC*) phase, most preferably SmC* wherein the director is tilted with respect to the layer normal. The director structure in the glassy smectic LC main-chain polymer fiber is not critical. Preferably the transition from the smectic C* or smectic A* to the glass is well above room temperature.

When the glassy phase is produced by cooling from a chiral smectic C* ferroelectric (FLC) phase, the methods of the present disclosure produce thin films of aligned ferroelectric liquid crystals. Such glassy thin films are useful, for example, in electro-optic devices based on NLO effects, such as the Pockel's effect. Such devices include ultra-fast modulators and directional couplers, and have previously been fabricated using organic poled polymer films as described in, for example, Dalton, L. R. et al., J. Mater. Chem. 9:1905 (1999), incorporated herein by reference in its entirety. The FLC thin films of the present disclosure can be used in such electro-optical devices, with appropriate additional processing known to those skilled in the art such as fabrication of waveguide structures, with the advantage that the FLC glass is thermodynamically stable, while the poled polymer films are not.

The following examples are provided purely for illustrative purposes, and are not to be construed as limiting the scope of the invention in any way.

EXAMPLE 1

This example provides an exemplary protocol for the synthesis of a "sideways twin" monomer liquid crystal herein referred to as "azo-dye 3":

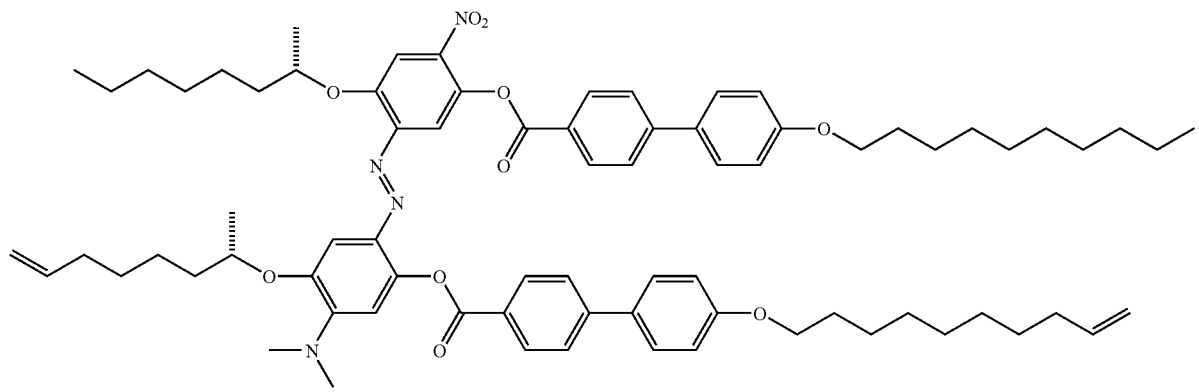

Azo-dye 3 was synthesized according to the following scheme:

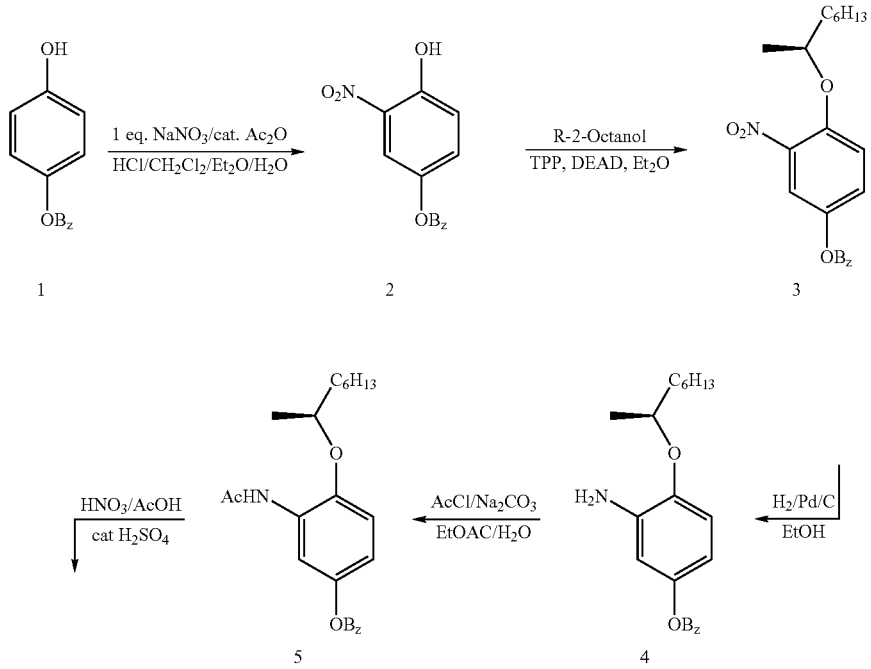

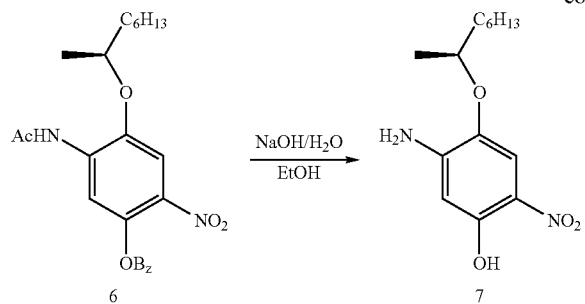
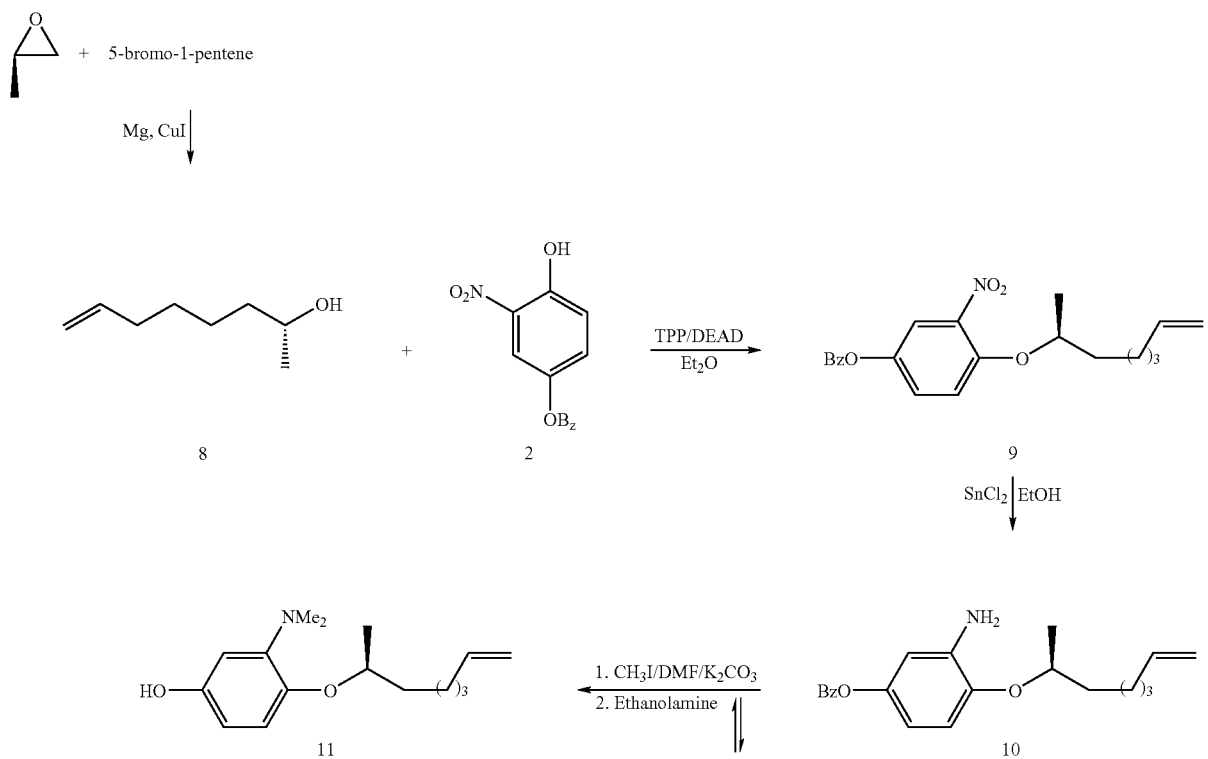
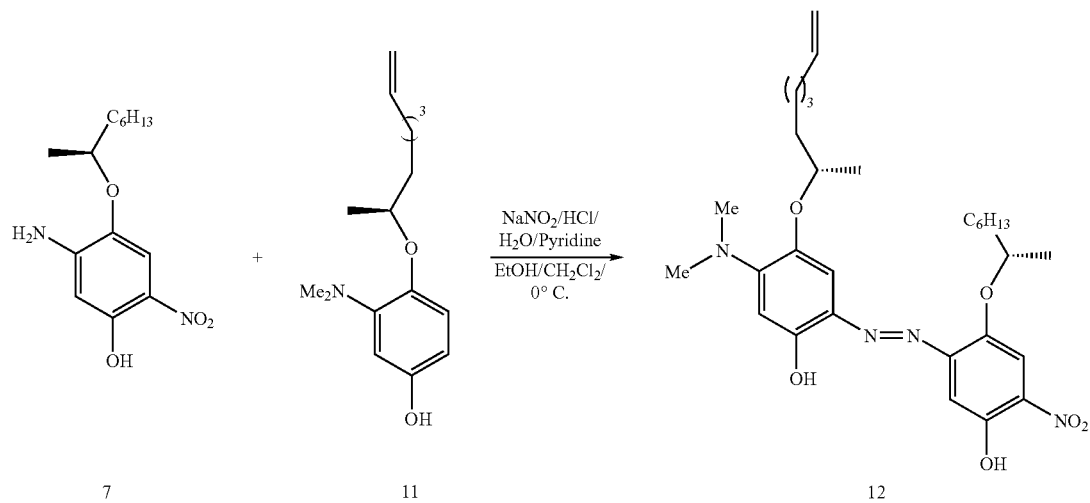

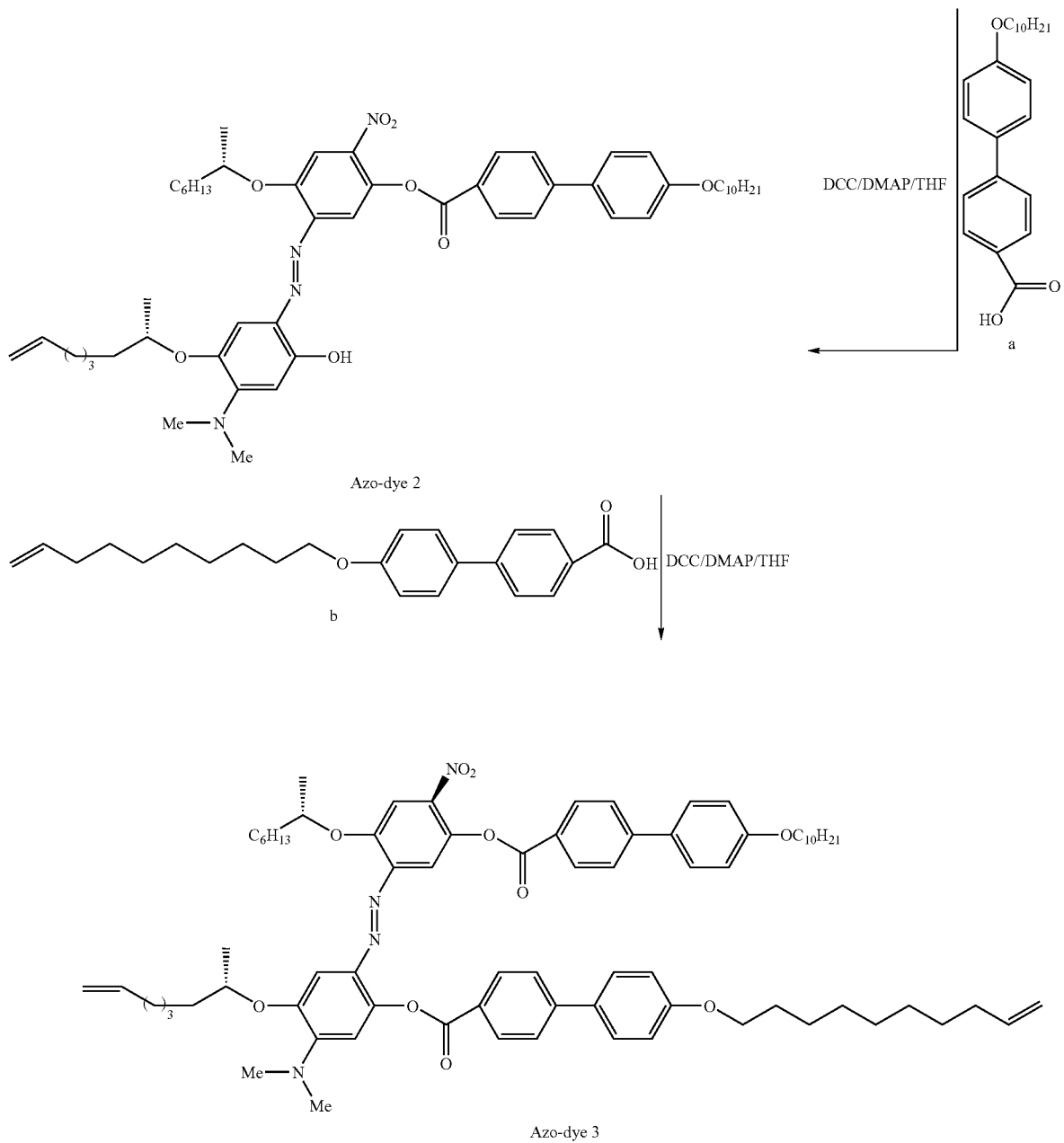

Azo-dye 3 has a monotropic SmC* phase [phase sequence on heating: X-97-I, phase sequence on cooling: I-88-SmC*-65-X, where I=isotropic phase, X=crystalline phase, and transition temperatures are given in degrees C.]. The individual reaction steps in the above schema are described in detail below:

Benzoic acid 4-hydroxy-3-nitro-phenyl ester (2). To a solution of benzoic acid 4-hydroxy-phenyl ester (1) (Lancaster Chemicals) (25 g, 116.7 mmol, 1.0 equiv), NaNO$_3$ (10.1 g, 118.8 mmol, 1.02 equiv), H$_2$O (140 ml), dichloromethane (243 ml), ether (469 ml) was carefully added 28 ml concentrated HCl. With vigorous stirring acetic anhydride (3 ml) was added. The reaction mixture was stirred overnight and then the organic layer was separated, washed with brine, dried (MgSO$_4$). Evaporation of solvent yielded an organic powder which was recrystallized twice from ethanol to yield yellow crystals. The mother liquor was concentrated and purified via flash chromatography over silica gel (80:15:5-hexanes:EtOAc:CH$_2$Cl$_2$). Total yield=24.2502 g (80.2%) of a yellow solid: M.P. 97° C.; $^1$H NMR (300 MHz, CDCl$_3$) δ 7.22 (d, J=9.3 Hz, 1H), 7.44-7.70 (m, 4H), 7.99 (d, J=2.7 Hz, 1H), 8.17 (dd, J=1.2, 7.2 Hz, 2H), 10.51 (s, 1H); $^{13}$C NMR (100

MHz, CDCl₃) δ 117.69, 120.72, 128.58, 128.71 (2C), 130.23 (2C), 131.83, 133.09, 134.08, 143.00, 152.91, 164.88; MS (EI+) m/e 259 (105, 77). Analysis calculated for $C_{13}H_9NO_5$: C, 60.24; H, 3.50; N, 5.40. found: C, 60.25; H, 3.56; N, 5.42.

(S)-4-(1-Methylheptyloxy)-3-nitro-phenylbenzoate (3). DIAD (9.8 g, 48.65 mmol, 1.5 equiv.) was added via syringe with stirring and under argon to a solution of 2 (8.44 g, 32.55 mmol, 1.0 equiv.) triphenylphosphine (12.81 g, 48.65 mmol, 1.5 equiv.), and (R)-2-octanol (4.24 g, 32.55 mmol, 1.0 equiv.) in 420 anhydrous ether. The reaction mixture was stirred overnight at 25° C., and the was treated with 30% hydrogen peroxide. The organic layer was separated, washed with brine, dried (MgSO₄). Chromatography (SiO₂, 90:10-hexanes:EtOAc) to yield 6.3307 g (52.4%) of a yellow oil: ¹H NMR (300 MHz, CDCl₃) δ 0.82 (t, J=6.8 Hz, 3H), 1.15-1.65 (m, 12H), 1.78 (m, 1H), 4.48 (m, 1H), 7.09 (d, J=9 Hz, 1H), 7.37 (dd, J=2.8, 9.0, 1H), 7.46-7.67 (m, 3H), 7.70 (d, J=2.8 Hz, 1H), 8.16 (dd, J=2.1, 7.2 Hz, 2H); ¹³C NMR (75 MHz, CDCl₃) δ 14.00, 19.45, 22.50, 25.18, 29.10, 31.66, 36.16, 76.94, 116.44, 119.12, 127.25, 128.71 (2C), 128.77, 130.24 (2C), 134.02, 140.44, 142.79, 149.57, 164.96; MS (EI+) m/e 371 (259, 213, 184, 105, 77, 55, 43, 41); Analysis calcd for $C_{21}H_{25}NO_5$: C, 67.90; H, 6.78; N, 3.77. found: C, 68.21; H, 7.09; N, 3.69.

(S)-4-(1-methyl-6-heptyloxy)-3-nitro-phenylbenzoate (9). DIAD (6.67 g, 33.11 mmol, 1.48 equiv.) was added via syringe with stirring and under argon to a solution of 2 (5.742 g, 22.15 mmol, 1.0 equiv.), TPP (8.683 g, 33.11 mmol, 1.48 equiv.), and (R)-2-octanol (2.818 g, 22.15 mmol, 1.0 equiv.) in 286 anhydrous ether. The reaction mixture was stirred overnight at 25° C., and the was treated with water. The organic layer was separated, washed with brine, dried (MgSO₄). Chromatography (SiO₂, 90:10-hexanes:EtOAc) to yield 7.58 g (92.6%) of a yellow oil: ¹H NMR (500 MHz, CDCl₃) δ 1.342-1.499 (m, 7H), 1.610-1.658 (m, 1H), 1.772-1.810 (m, 1H), 2.053 (m, 2H), 4.587 (m, 1H), 4.919 (m, 2H), 5.784 (m, 1H), 7.087 (d, J=9 Hz, 1H), 7.371 (dd, J=3, 9 Hz, 1H), 7.484-7.515 (m, 2H), 7.621-7.651 (m, 1H), 7.696 (d, J=3 Hz, 1H), 8.158 (dd, J=1, 7.5 Hz, 2H); ¹³C NMR (125 MHz, CDCl₃) δ 19.447, 24.663, 28.658, 33.537, 35.994, 76.791, 114.484, 116.408, 119.069, 127.199, 128.652 (2C), 128.687, 130.161 (2C), 133.960, 138.621, 140.376, 142.770, 149.419, 164.857; MS (EI+) m/e 369 (259, 105, 77, 41). Analysis calcd for $C_{21}H_{23}NO_5$: C, 68.28; H, 6.28; N, 3.80. found: C, 68.17; H, 6.34; N, 3.70.

1-methyl-6-hepten-1-ol (8). A crystal of I₂ was added to pre-dried Mg (1.1 g, 45.26 mmol, 1.35 equiv.) under argon. A solution of 5-bromo-1-pentene (6.54 g, 43.9 mmol, 1.30 equiv.) in 20 ml dry THF was slowly added to the Mg under argon. Stirred one hour at 25° C. after the addition, then 0.5 hour at 0° C. Solid CuI (0.795 g, 2.374 mmol, 0.07 equiv.) was added to the solution, stirred for 0.5 hour, then a solution of R-(+)-Propylene oxide (1.968 g, 33.884 mmol, 1.0 equiv.) in 12 ml dry THF was added. Stirred three hours at 0° C., then poured into saturated NH₄Cl/H₂O, stirred one hour more. Extracted with Et₂O, dried (MgSO₄). Chromatography (SiO₂, 80:20-hexanes:EtOAc) to yield of 2.867 g (66%) clear oil. ¹H NMR (500 MHz, CDCl₃) δ 1.167 (d, J=6.0 Hz, 3H), 1.298-1.466 (m, 6H), 2.022-2.063 (m, 2H), 3.757-3.783 (m, 1H), 4.906-5.003 (m. 2H), 5.747-5.814 (m, 1H); ¹³C NMR (125 MHz, CDCl₃) δ 23.259, 25.126, 28.777, 33.607, 38.999, 67.762, 114.211, 138.748. MS (EI+) (111, 95, 82, 69, 54, 45, 27); Analysis calcd for $C_8H_{16}O$: C, 74.94; H, 12.58. found: C, 74.05; H, 12.55.

(S)-4-(1-Methylheptyloxy)-3-amino-phenylbenzoate (4). Compound 3 (3.15 g, 8.5 mmol, 1.0 equiv.) was dissolved in ethanol (86 ml), a small scoop of 10% Pd/C was added. The reaction mixture was stirred under hydrogen (balloon) overnight, filtered through celite. Evaporation of solvent yield 2.8 g (96%) of a viscous brown oil: ¹H NMR (300 MHz, CDCl₃) δ 0.87 (t, J=6.59, 3 Hz), 1.28-1.59 (m, 12H), 1.70-1.77 (m, 1H), 3.86 (s, 2H), 4.31 (m, 1H), 6.50 (dd, J=8.79, 2.69 Hz, 1H), 6.56 (d, J=2.69 Hz, 1H), 6.76 (d, J=8.79 Hz, 1H), 7.47 (t, J=7.32 Hz, 2H), 7.60 (t, J=7.32 Hz, 1H), 8.16 (d, J=7.08 Hz, 2H); ¹³C NMR (75 MHz, CDCl₃) δ 13.94, 19.79, 22.47, 25.42, 29.18, 31.67, 36.47, 74.97, 108.37, 110.26, 113.54, 128.40 (2C), 129.80, 130.02 (2C), 133.28, 138.23, 143.25, 144.72, 165.49; MS (EI+) m/e 341 (229, 149, 125, 105, 77, 57, 43).

(S)-4-(1-Methyl-heptyloxy)-3-(N-acetyl)amino-phenylbenzoate (5). Acetyl Chloride (3.744 ml, 52.56 mmol, 10 equiv.) was added to a stirred solution of 3 (1.80 g, 5.27 mmol, 1.0 equiv.) in 54 ml EtOAc, and 108 ml of a 10% aqueous Na₂CO₃ solution. The reaction mixture was stirred for 20 minutes and then an additional 3.744 ml acetyl chloride was added. The reaction mixture was stirred for two hours, the organic layer was separated, washed with brine, dried (MgSO₄). Evaporation of the solvent yielded 1.97 g (97.5%) red-brown viscous oil. No further purification: ¹H NMR (300 MHz, CDCl₃) δ 0.88 (t, J=5.37 Hz, 3H), 1.21-1.83 (m, 13H), 2.18 (s, 3H), 4.38 (m, 1H), 6.85 (s, 2H), 7.48 (t, J=8.06 Hz, 2H), 7.60 (t, J=6.84 Hz, 1H), 7.81 (bd, s, 1H), 8.17 (d, J=8.30 Hz, 2H), 8.28 (s, 1H); ¹³C NMR (75 MHz, CDCl₃) δ 13.78, 19.51, 22.28, 24.54, 25.23, 28.93, 31.47, 36.09, 75.50, 112.36, 113.30, 115.90, 128.29 (2C), 129.19, 129.41, 129.92 (2C), 133.27, 143.72, 143.94, 165.32, 167.97; MS (EI+) m/e 383 (271, 229, 149, 105, 77, 43). Analysis calcd for $C_{23}H_{29}NO_4$: C, 72.00; H, 7.62; N, 3.65. found C, 72.14; H, 7.96; N, 3.33.

(S)-4-(Methylheptyloxy)-5-(N-acetyl)amino-2-nitro-phenylbenzoate (6). A solution of concentrated nitric acid (2.883 ml) and glacial acetic acid (16 ml) was added at 0° C. to a stirred solution of 5 (1.84 g, 4.8 mmol) in 98 ml glacial acetic acid and 4.3 ml concentrated H₂SO₄. The reaction mixture was stirred for 20 minutes as it warmed to room temperature. Water (approx. 500 ml) was added and the reaction mixture was extracted with CH₂Cl₂, washed with brine, dried (MgSO₄). Evaporation of the solvent yielded 1.96 g (95%) of a yellow solid. No further purification: ¹H NMR (300 MHz, CDCl₃) δ 0.87 (t, J=7.0 Hz, 3H), 1.27-1.46 (m, 11H), 1.58-1.68 (m, 1H), 1.74-1.84 (m, 1H), 2.2 (s, 3H), 4.51 (m, 1H), 7.50 (t, J=7.8 Hz, 2H), 7.66 (m, 2H), 8.02 (s, 1H), 8.18 (dd, J=0.6, 8.4 Hz), 8.46 (s, 1H); ¹³C NMR (75 MHz, CDCl₃) δ 13.88, 19.29, 22.36, 24.58, 25.24, 28.93, 31.51, 35.90, 76.47, 108.21, 114.72, 128.58 (3C), 130.29 (2C), 133.98, 134.71, 135.13, 139.01, 143.28, 165.00, 168.91; MS (EI+) m/e 428 (257, 105, 43). Analysis calcd for $C_{23}H_{29}N_2O_6$: C, 64.32, H, 6.805; N, 6.52. found: C, 64.26; H, 6.69; N, 6.40.

(S)-4-(Methylheptyloxy)-2-nitri-5-aminophenol (7). NaOH (4.44 g, 111 mmol, 25 equiv.) was added to a stirred solution of 6 (1.9 g 4.46 mmol, 1.0 equiv.), water (52 ml), ethanol (162 ml). The reaction mixture was stirred overnight at 25° C., neutralized with concentrated HCl. The solution was extracted with CH$_2$Cl$_2$, washed with brine, dried (MgSO$_4$). Chromatography (SiO$_2$, 90:10 to 80:20-hexanes: EtOAc) gave 1.5 g (91%) of an orange oil: $^1$H NMR (300 MHz, CDCl$_3$) δ 0.85 (t, J=6.59 Hz, 3H), 1.22-1.41 (m, 11H), 1.60 (m, 1H), 1.69 (m, 1H), 4.35 (m, 1H), 4.89 (bd s, 2H), 6.18 (s, 1H), 7.32 (s, 1H), 11.38 (s, 1H); $^{13}$C NMR (75 MHz, CDCl$_3$) δ 13.98, 19.39, 22.49, 25.32, 29.13, 31.67, 36.14, 75.56, 99.48, 106.55, 123.44, 138.87, 148.63, 154.55. MS (EI+) m/e 282 (170, 140, 57, 41); Analysis calcd for C$_{14}$H$_{22}$N$_2$O$_4$: C, 59.54; H, 7.86; N, 9.93. found: C, 59.55; H, 8.24; N, 9.78.

(S)-4-(1-Methyl-6-heptenloxy)-3-amino-phenylbenzoate (10). Compound 9 (7.5 g, 20.30 mmol, 1.0 equiv.) was added to the solution of SnCl$_2$ (19.25 g, 101.5 mmol, 5 equiv.) in 50 ml ethanol, the reaction mixture was refluxed (70° C.) for one hour, poured into ice, neutralized with aqueous 20% NaOH, extracted with Et$_2$O. Chromatography (SiO$_2$, 80:20-hexanes: EtOAc) gave 3.55 g (50%) clear oil $^1$H NMR (500 MHz, CDCl$_3$) δ 1.3 (d, J=6 Hz, 3H), 1.396-1.453 (m, 4H), 1.556-1.625 (m, 1H), 1.744-1.803 (m, 1H), 2.043-2.082 (m, 2H), 3.805 (bd s, 2H), 4.32 (m, 1H), 4.927-5.020 (m, 2H), 5.771-5.825 (m, 1H), 6.512 (dd, J=2.5, 6 Hz, 1H), 6.577 (d, J=2.5 Hz, 1H), 6.763 (d, J=9 Hz, 1H), 7.477 (t, J=7.5 Hz, 2H), 7.598 (t, J=7.5 Hz, 1H), 8.168 (d, J=7 Hz, 2H); $^{13}$C NMR (125 MHz, CDCl$_3$) δ 19.841, 24.945, 28.765, 33.588, 36.305, 74.855, 108.406, 110.302, 113.475, 114.402, 128.384 (2C), 129.749, 130.002 (2C), 133.280, 138.131, 138.707, 143.179, 144.682, 165.449. MS (EI+) m/e 339 (229, 125, 105, 57, 43).

(S)-4-(1-Methyl-6-heptenloxy)-3-(N,N-dimethylamino)-phenol (11). MeI (115.26 g, 812.3 mmol, 80 equiv.) was added to a stirred solution of 10 (3.45 g, 10.2 mmol, 1.0 equiv.), anhydrous K$_2$CO$_3$ (4.212 g, 30.474 mmol, 3.0 equiv.), and DMF (101 ml). The reaction mixture was stirred for two hours at 25° C.; the excess MeI was evaporated off. Ethanolamine (205 ml) was added, the reaction mixture was refluxed (165° C.) for two hours, then cooled, diluted with water, extracted twice with EtOAc. The organic layer was washed with brine and dried (MgSO$_4$). Chromatography (SiO$_2$, 80/20 to 50/50 of hexanes/EtOAc) gave 2.56 g (95%) of a yellow oil: $^1$H NMR (500 MHz, CDCl$_3$) δ 1.192 (d, J=6 Hz, 3H), 1.352-1.385 (m, 4H), 1.471-1.528 (m, 1H), 1.704-1.760 (m, 1H), 1.979 (m, 2H), 2.595 (s, 6H), 4.243-4.291 (m, 1H), 4.877-4.954 (m, 2H), 5.703-5.784 (m, 1H), 6.298-6.347 (m, 2H), 6.623 (d, J=8.5 Hz, 1H), 7.329 (bd s, 1H); $^{13}$C NMR (125 MHz, CDCl$_3$) δ 19.383, 25.0, 28.826, 33.607, 36.085, 43.008 (2C), 73.610, 106.783, 108.250, 114.267, 115.257, 138.818, 43.458, 143.543, 150.423. MS (EI+) m/e 263 (152, 138, 124, 109, 81, 69, 55, 42, 27).

(S)-4-(1-Methylheptyloxy)-5-[(S)-5'-(1-Methyl-6-heptenloxy)-2'-hydroxy-4'-(N,N-dimethylamino)-phenylazo]-2-nitrophenol (Azo-dye 1). The amino-nitro compound 7 (714 mg, 2.53 mmol, 1.0 equiv.) was dissolved in 66 ml of 15% concentrated HCl in ethanol solution, cooled to 0° C. with ice-salt bath. NaNO$_2$ (25 ml, 0.1M, 1 equiv.) was added dropwise to keep the temperature below 2° C. Compound 11 (664.7 mg, 2.53 mmol, 1.0 equiv.) in 10 ml CH$_2$Cl$_2$ was added. Pyridine (7.8 ml) was added dropwise to keep the temperature below 2° C. An additional CH$_2$Cl$_2$ was added, stirred at 0° C. for one hour, then warm to room temperature for 30 minutes. Separated the organic layer, extracted the aqueous layer with CH$_2$Cl$_2$, washed with 5% HCl, then brine, dried (MgSO$_4$). Chromatography (85:10:5-Hexanes:EtOAc:CH$_2$Cl$_2$) yielded 791.9 mg (56.2%) of metallic green solid: $^1$H NMR (500 MHz, CDCl$_3$) δ 0.825 (t, J=7 Hz, 3H), 1.226-1.449 (m, 18H), 1.590-1.669 (m, 2H), 1.745-1.890 (m, 2H), 2.026-2.065 (m, 2H), 3.138 (s, 6H), 4.333-4.412 (m, 2H), 4.911-4.989 (m, 2H), 5.661 (s, 1H), 5.723-5.791 (m, 1H), 6.095 (s, 1H), 7.297 (s, 1H), 7.427 (s, 1H), 11.068 (s, 1H); $^{13}$C NMR (125 MHz, CDCl$_3$) δ 13.739, 18.759, 19.187, 22.241, 24.508, 25.042, 28.342, 28.819, 31.431, 33.20, 35.475, 35.601, 43.338 (2C), 74.572, 76.082, 100.647, 103.567, 107.029, 107.253, 114.288, 126.391, 136.754, 138.130, 139.379, 143.262, 147.306, 152.810, 155.063, 176.525; MS(CI−) m/e 556, (EI+) (435, 353, 278, 252, 213, 167, 43). Analysis cacld for C$_{30}$H$_{44}$N$_4$O$_6$: C, 64.73; H, 7.97; N, 10.06. found: C, 63.82; H, 7.94; N, 9.7.

Azo-dye 2. DCC (684.1 mg, 3.30 mmol, 2.48 equiv.) dissolved in 2 ml dry THF was added under argon to a solution of azo-dye 1 (739.5 mg, 1.33 mmol, 1.0 equiv.), carboxylic acid a (470.39 mg, 1.33 mmol, 1.0 equiv.), and DMAP (98.2 mg, 0.7856 mmol, 0.60 equiv.) in 12 ml dry THF. The reaction mixture was stirred at room temperature for two days, treated with 5% HCl, extracted twice with CH$_2$Cl$_2$, dried (MgSO$_4$). Chromatography (90:5:5-hexanes:EtOAc:CH$_2$Cl$_2$) yielded 426 mg (46%) of red solid: $^1$H NMR (300 MHz, CDCl$_3$) δ 0.862 (m, 6H), 1.204-2.037 (m, 40H), 3.113 (s, 6H), 4.079 (t, J=6.5 Hz, 2H), 4.309 (m, 1H), 4.39 (m, 1H), 4.881-4.983 (m, 2H), 5.724 (s, 1H), 5.759-5.794 (m, 1H), 6.135 (s, 1H), 6.987 (d, J=8.7 Hz, 2H), 7.558-7.712 (m, 6H), 8.228 (d, J=8.4 Hz, 2H); $^{13}$C NMR (125 MHz, CDCl$_3$) δ 14.048, 14.090, 19.117, 19.594, 22.557, 22.648, 24.824, 25.372, 26.004, 28.622, 29.100, 29.212, 29.289, 29.367, 29.528, 29.549, 31.719, 31.859, 33.495, 35.826, 36.029, 43.569 (2C), 68.092, 74.776, 76.545, 104.283, 108.032, 109.022, 110.083, 114.569, 114.920 (2C), 126.560 (2C), 126.897, 128.364 (2C), 130.976 (2C), 131.917, 134.598, 136.347, 138.509, 140.032, 140.489, 142.981, 143.147, 147.102, 155.499, 159.543, 164.787, 176.504. MS (FAB+) m/e: 893 (M$^+$+1) (337, 279, 154). Analysis calcd for C$_{53}$H$_{72}$N$_4$O$_8$: C, 71.27; H, 8.12; N, 6.27. found: C, 71.55; H, 8.24; N, 6.07.

Azo-dye 3. DCC (388.6 mg, 1.876 mmol, 2.48 equiv.) dissolved in 2 ml dry THF was added under argon to a solution of Azo-dye 2 (672.8 mg, 0.754 mmol, 1.0 equiv.), carboxylic acid b (269 mg, 0.754 mmol, 1.0 equiv.), and DMAP (73.01 mg, 0.58 mmol, 0.76 equiv.) in 9 ml dry THF. The reaction mixture was stirred at room temperature for two days, treated with 5% HCl, and extracted twice with CH$_2$Cl$_2$, dried (MgSO$_4$).

Chromatography (90:5:5-hexanes:EtOAc:CH$_2$Cl$_2$) yielded 426 mg (46%) of red solid: $^1$H NMR (500 MHz, CDCl$_3$) δ 0.896 (m, 6H), 1.296-1.856 (m, 50H), 2.026-2.096 (m, 4H), 3.042 (s, 6H), 3.785 (t, J=10.5 Hz, 2H), 4.022 (t, J=10.5 Hz, 2H), 4.459-4.605 (m, 2H), 4.930-5.037 (m, 4H), 5.744-5.892 (m, 2H), 6.769-6.812 (m, 3H), 6.997 (d, J=14 Hz, 2H), 7.252 (s, 1H), 7.323-7.515 (m, 9H), 7.772 (s, 1H), 7.947 (d, J=14 Hz, 2H), 8.214 (d, J=14 Hz, 2H); $^{13}$C NMR (125 MHz, CDCl$_3$) δ 14.020, 14.069, 19.306, 19.664, 22.578, 22.634, 24.958, 25.239, 25.983, 26.046, 28.819, 28.868, 29.065, 29.268, 29.289, 29.318, 29.402 (3C), 29.542, 29.563, 29.64, 31.747, 31.852, 33.579, 33.748, 36.198, 36.436, 42.748 (2C), 67.811, 68.043, 74.685, 78.272, 100.822, 110.216, 113.509, 114.14, 114.484, 114.527, 114.716 (2C), 114.807 (2C), 126.209 (2C), 126.258, 126.391 (2C), 127.206, 128.139 (2C), 128.273 (2C), 130.625 (2C), 130.709 (2C), 131.657, 131.706, 136.424, 138.312, 138.565, 139.014, 141.268, 145.698, 145.74, 147.214, 147.285, 147.601, 149.028, 152.648, 159.332, 159.522, 164.099, 166.1; MS (ES), m/e 1227; Analysis calcd for $C_{76}H_{98}N_4O_{10}$: C, 74.36; H, 8.046; N, 4.56. found: C, 74.19; H, 8.25; N, 4.44.

This synthesis scheme is described in Walba, D. M.; Dyer, D. J.; Sierra, T.; Cobben, P. L.; Shao, R.; Clark, N. A., *Ferroelectric Liquid Crystals for Nonlinear Optics: Orientation of the Disperse Red 1 Chromophore Along the Ferroelectric Liquid Crystal Polar Axis*, J. Am. Chem. Soc. 118:1211-1212 (1996) and in Xiao, Ph.D. Thesis, *Main-chain ferroelectric liquid crystal polymers for nonlinear optics*, University of Colorado (Boulder), 2002, each incorporated herein by reference in its entirety.

EXAMPLE 2

Azo-dye 3 is a diene and may be polymerized using an olefine metathesis catalyst such as the Grubbs catalyst known as the "Grubbs catalyst 1st generation." To this end, minimum solvent 1,2-dichloroethane was added to a azo-dye 3/Grubb's catalyst (150:1) mixture and refluxed under water aspirator pressure at 30° C. according to the scheme below.

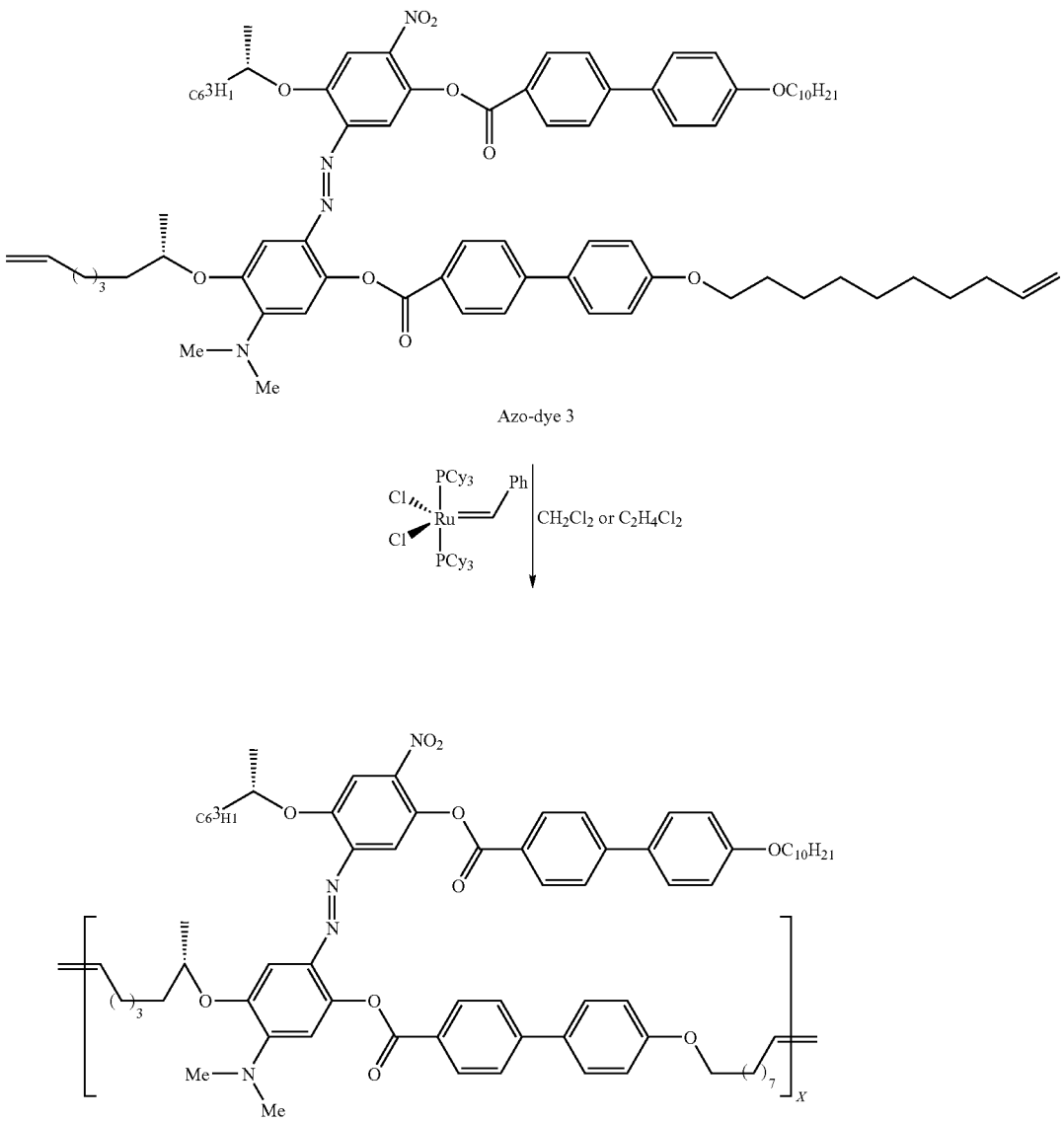

After three days of refluxing, the solution was treated with 5% HCl in methanol, then precipitated with methanol three times to yield a dark red polymer compound.

This synthesis scheme is also described in L. Xiao, Ph.D. Thesis, *Main-chain ferroelectric liquid crystal polymers for nonlinear optics*, University of Colorado (Boulder), 2002, and in D. M. Walba, L. Xiao, P. Keller, R. Shao, D. Link, N. A. Clark, Pure Appl. Chem. 51:2117 (1999), each of which is incorporated herein by reference in its entirety. Samples of the polymerized azo-dye 3 have been shown to possess a hydrodynamic radius equal to a polystyrene standard of 40K Daltons molecular weight. Samples of this polymer were shown to possess the phase sequence [I-125-SmC*-85-glass]. This sequence and approximate transition temperatures are seen on both heating and cooling, indicating that the material possesses an enantiotropic SmC* phase. No indication of crystallization from the glass can be seen by differential scanning calorimetry, indicating that the glass is stable. X-ray scattering data from "powder" samples of the SmC* phase and the glass show a smectic layer spacing of about 26.6-26.9 Å, consistent with a SmC* phase with a large tilt angle of about 40°.

As described in L. Xiao, Ph.D. Thesis, *Main-chain ferroelectric liquid crystal polymers for nonlinear optics*, University of Colorado (Boulder), 2002, and in D. M. Walba, L. Xiao, P. Keller, R. Shao, D. Link, N. A. Clark, Pure Appl. Chem. 51: 2117 (1999), samples of the polymerized azo-dye 3 in the isotropic phase can be "pulled" into fibers with diameters of about 1 micron to about 100 microns by simply dipping a glass rod into a small sample of the polymer in the isotropic phase, and pulling the rod out of the heated sample into the ambient lab environment by hand. The fiber diameter can be controlled to some degree by the rate at which the fiber is pulled. Inspection by polarized light microscopy of such fibers showed a smooth texture indicative of good alignment. Further characterization shows that the optical "fast axis" of the fibers is parallel to the fiber axis.

Figure 4:
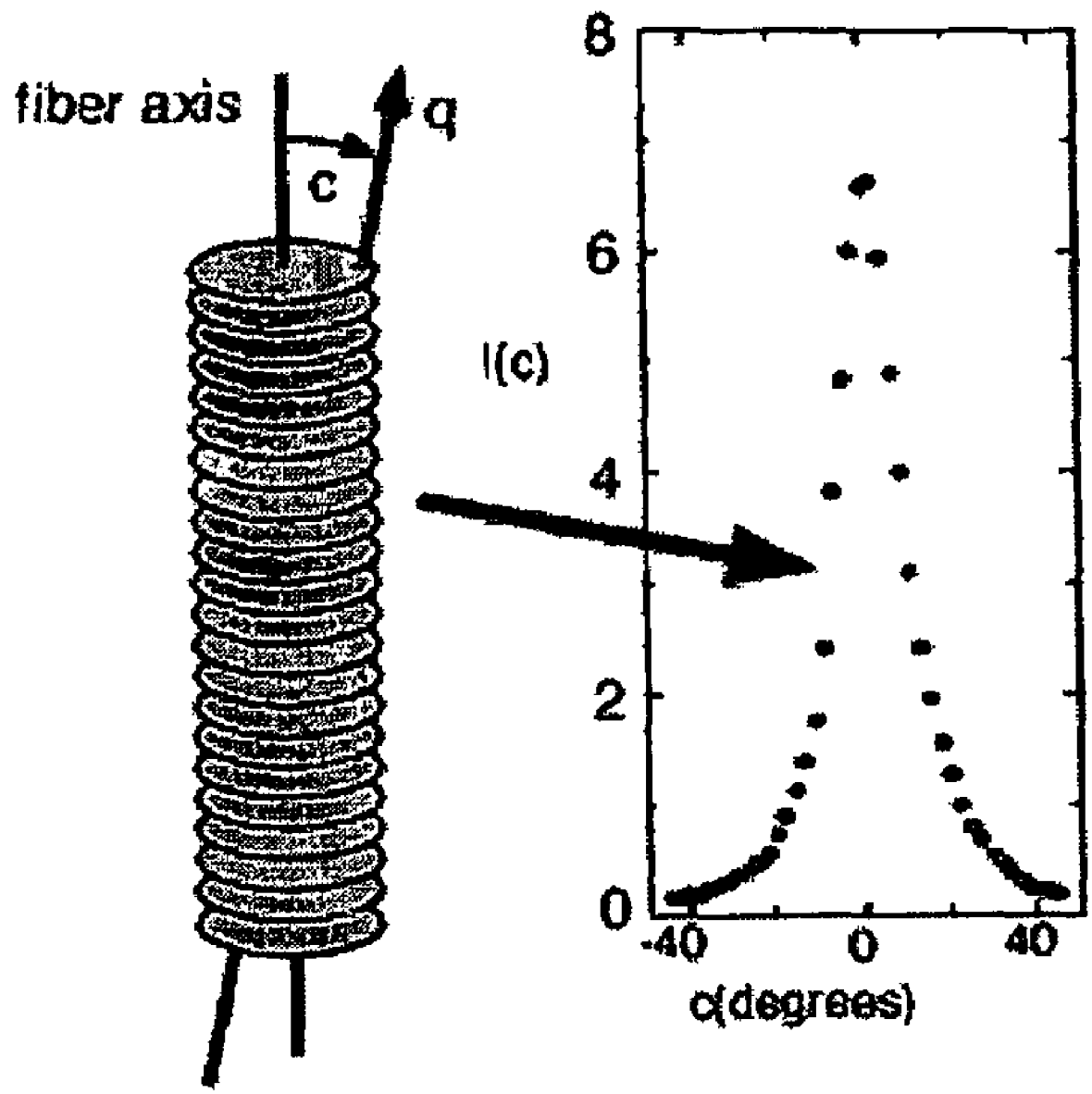
FIG. 4 depicts the X-ray "rocking curve" of fibers pulled from polymerized azo-dye 3 at room temperature. The curve shows that the layers in the fiber are oriented perpendicular to the fiber axis.

Further characterization of fibers pulled from polymerized azo-dye 3 at room temperature shows that the layers in the fiber are oriented perpendicular to the fiber axis, as indicated by the X-ray "rocking curve" shown in FIG. 4. In addition, the lineshape of the rocking curve shows a low degree of "mosaicity" of the layer structure, indicating a high degree of alignment in the layer structure of the polymer glass fibers. The director is tilted off the layer normal by about 40°, as indicated by the layer spacing, determined by X-ray scattering. Furthermore, there is no evidence of a SmC* helix in the SmC* phase or the glass.

Figure 5:
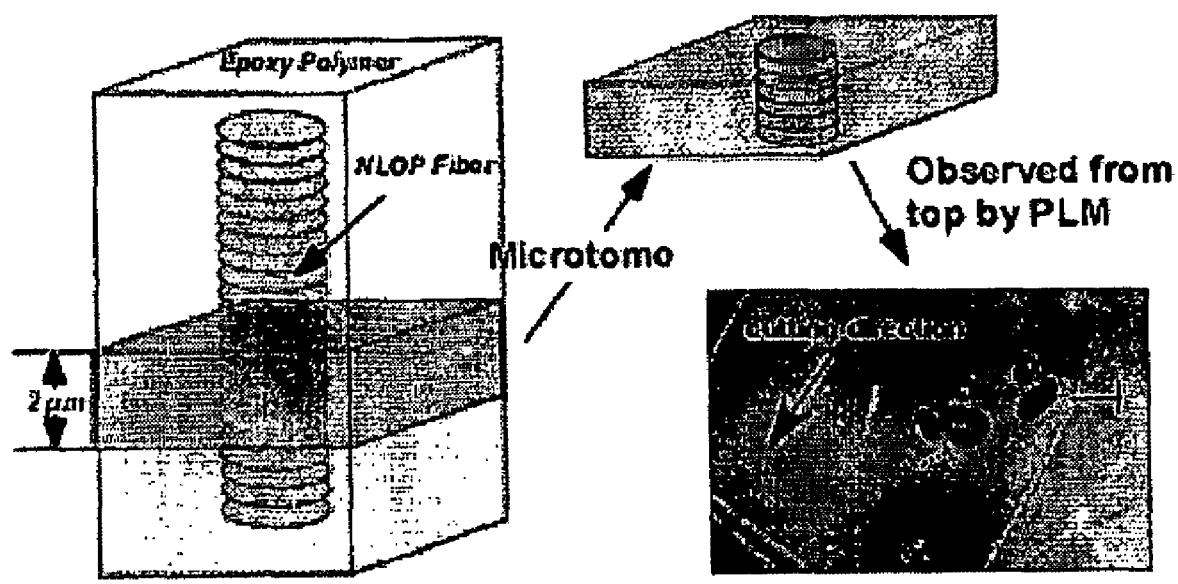
FIG. 5 illustrates thin sections (~1 micron thickness) of polymerized azo-dye 3 fibers in the frozen glass by polarized light microscopy (PLM). The "nails" in FIG. 5 (T-shaped graphics superposed on the photomicrograph) indicate the orientation of the c-director in the frozen SmC* phase.

An examination of thin sections (~1 micron thickness) of the fibers by polarized light microscopy (PLM) is shown in FIG. 5. The "nails" in FIG. 5 (T-shaped graphics superposed on the photomicrograph) indicate the orientation of the c-director in the frozen SmC* phase. This can be determined by rotation of the sample between crossed polarizers (polarizer vertical in this photomicrograph). Extinction indicates the c-director is parallel or perpendicular to the polarizer. Transmission of red light indicates the c-director is not parallel or perpendicular to the polarizer. Note that the fiber cross section is not necessarily circular in the hand-drawn fibers. The observation of good extinction shows that the c-director, and therefore the LC director, is substantially uniform in the sample. This shows that any helix present in the glass fibers at room temperature must have a helix pitch substantially larger than 1 micron.

Figure 6:
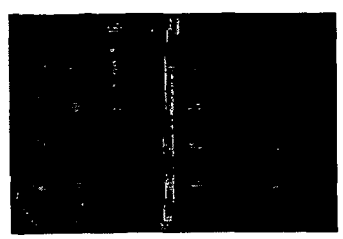
FIG. 6 illustrates a thin film of aligned polymerized azo-dye 3 in the SmC* phase (~100° C.) by polarized light microscopy showing that the extinction direction is along the layer normal (V=0).
Figure 6:
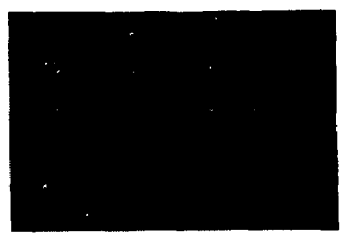
Figure 6:
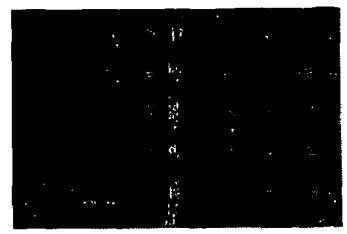

A fiber prepared by pulling from the isotropic melt of a sample of polymerized azo-dye 3 was processed according to the methods of the present disclosure. The fiber diameter was about 70 microns. Using 7.5 micron spacers (in this case Kapton strips), and clean ITO-glass plates, a thin film was produced according to the present disclosure by heating the cell to about 100° C. and allowing both plates to contact the mylar spacers. Cooling to room temperature gave a ribbon of smectic liquid crystal about 1 cm in length, about 500 microns in width, and about 7.5 micron in thickness. Observation of this thin film by polarized light microscopy showed that the extinction direction is along the layer normal, as indicated in FIG. 6. This suggests a twisted director structure, as expected if polar anchoring is strong (that is, the ferroelectric polarization is oriented into or out of the plates at both surfaces).

Heating the sample into the SmC* phase at 100° C. allows switching of the ferroelectric. As indicated in FIG. 6, application of a positive or negative field, causes the optic axis of the sample to rotate. This rotation saturates at about 10 volts/micron applied field, and a rotation of the optic axis of about 40°, completely consistent with a well-aligned SmC* thin film with a 40° tilt angle. As shown in FIG. 6, when the polarizer is oriented normal to the layers (vertical in the figure), transmission increases dramatically as the optic axis rotates to 40° off the polarizer. The high quality of the layer structure is evidenced by the good extinction at zero field, and smooth texture with applied fields. Specific surface treatments known to those familiar with the FLC art could be utilized to obtain other alignments of the SmC* thin films of this disclosure, including a uniform director structure at zero volts wherein the ferroelectric polarization can be either parallel or perpendicular to the plane of the substrate.

What is claimed is:

1. A method for aligning smectic liquid crystal glasses in thin films comprising the steps of:
    (a) heating a glassy liquid crystal (LC) main-chain polymer fiber into a smectic LC phase;
    (b) compressing said main-chain polymer fiber in the smectic phase between opposed substrates wherein an aligned thin film of smectic LC main-chain polymer is formed between said opposed substrates; and
    (c) cooling said thin film of smectic LC main-chain polymer into the glassy phase.

2. The method of claim 1 wherein the thin film in the glassy phase is in the frozen smectic phase.

3. The method of claim 2 wherein said smectic phase is selected from the group consisting of a smectic C* phase, a smectic A* phase, a smectic C phase, a polar smectic C phase, and a smectic A phase.

4. The method of claim 3 wherein said smectic phase is a smectic C* phase.

5. The method of claim 4 wherein the smectic C phase is a smectic C* ferroelectric LC phase.

6. The method of claim 1 wherein said main-chain polymer fiber has a diameter of from about 1 μm to about 100 μm.

7. The method of claim 1 wherein at least one of said substrates is comprised of glass.

8. The method of claim 1 wherein at least one of said substrates is comprised of a semi-conductor.

9. The method of claim 1 wherein said opposed substrates are separated by spacers.

10. The method of claim 1 wherein one or both of the heating and cooling steps is performed using a Peltier effect element.

11. The method of claim 1 wherein said main-chain polymer fiber is compressed using a weight placed on at least one of said opposed substrates.

12. The method of claim 1 wherein said main-chain polymer fiber is compressed by action of a piston on at least one of said opposed substrates.

13. The method of claim 1 wherein said LC main-chain polymer fiber in the glassy phase is prepared by pulling a fiber from an isotropic melt of the LC main-chain polymer.

14. The method of claim 1 wherein said LC main-chain polymer fiber in the glassy phase is prepared by extruding a fiber from an isotropic melt of the LC main-chain polymer.

15. The method of claim 1 wherein said main-chain polymer is
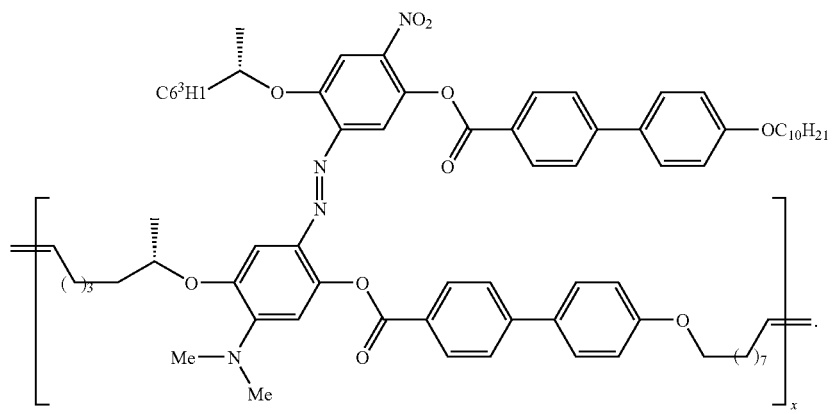
X = 9, 30
16. The method of claim 1 wherein the transition from the smectic LC phase to the glassy phase occurs at above room temperature.
* * * * *